(No Model.)
E. J. HART.
THILL COUPLING.
No. 330,585. Patented Nov. 17, 1885.
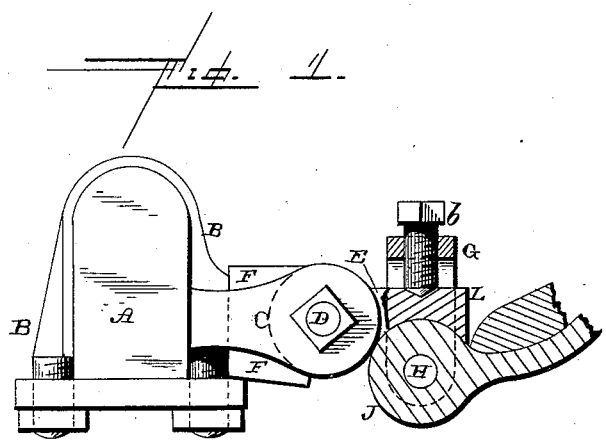
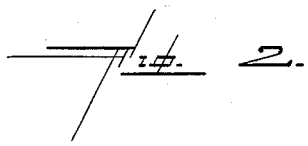
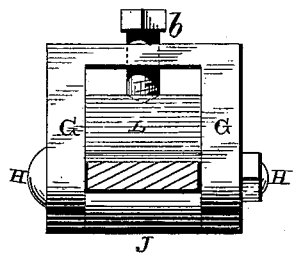

UNITED STATES PATENT OFFICE.

EDWIN J. HART, OF COLUMBIANA, OHIO.

THILL-COUPLING.

SPECIFICATION forming part of Letters Patent No. 330,585, dated November 17, 1885.

Application filed July 13, 1885. Serial No. 171,537. (No model.)

*To all whom it may concern:*

Be it known that I, EDWIN J. HART, a citizen of the United States, residing at Columbiana, in the county of Columbiana and State of Ohio, have invented certain new and useful Improvements in Thill-Couplings, of which the following is a specification, reference being had to the accompanying drawings.

My invention relates to an improvement in thill-couplings; and it consists in attaching in front of an ordinary coupling, instead of the thills, an additional coupling, and combining the two to form but one.

My object is to introduce a coupling that is readily attached and detached, and does not rattle when the vehicle is in motion.

The accompanying drawings represent my invention.

Figure 1 is a side elevation, partly in section, of a thill-coupling embodying my invention. Fig. 2 is a vertical cross-section taken at right angles to Fig. 1.

A represents an axle, around which a clip, B, is secured in the usual manner. In front of the clip, forming a part of it, are two jaws, C, with holes for the passage of a screw-bolt, D, that holds a thill-eye, E, between the jaws. A cushion, F, is packed, as usual, between the jaws at the rear of the eye F, to keep it from rattling. The bar L on the eye E, usually attached to the thills, is cut off at about one inch from the eye, its under side curved, and an indentation made on its flat upper side for the reception of the end of a screw.

G is a yoke or link holding the eye J of a second thill-iron secured in it by a screw-bolt, H, that passes through it from one side to the other, where it is held by a nut. Through the upper part of the yoke or link G passes a set-screw, *b*, into the indentation on top of the remaining part of the bar L that is inserted into the yoke, and its curved under side is thereby pressed down upon the eye on the thill-iron J and held in place; or the set-screw may be dispensed with by making the eye on the thill-iron J eccentric, that, when brought to a horizontal position, locks itself. The thills, by removing the set-screw *b*, will become uncoupled, and again coupled by replacing the short end of the iron J in the yoke G and securing it by the set-screw, which can be done in a short time.

I disclaim the clip and the eye E between the jaws C, they being old and in general use; but

What I claim, and wish to secure by Letters Patent, is—

1. The yoke or link G, in combination with the short bar L, the jaws C, eye E, and thill-iron J, substantially as described.

2. The combination of the yoke G, set-screw *b*, bar L, and thill-iron, with a suitable support, which is attached to clip, substantially as described.

In testimony whereof I affix my signature in presence of two witnesses.

EDWIN J. HART.

Witnesses:
 LOUIS MOESER,
 IG. STAUFFER.